Nov. 29, 1927.
H. C. KELLER
1,651,063
BELT REPLACER
Filed June 8, 1926
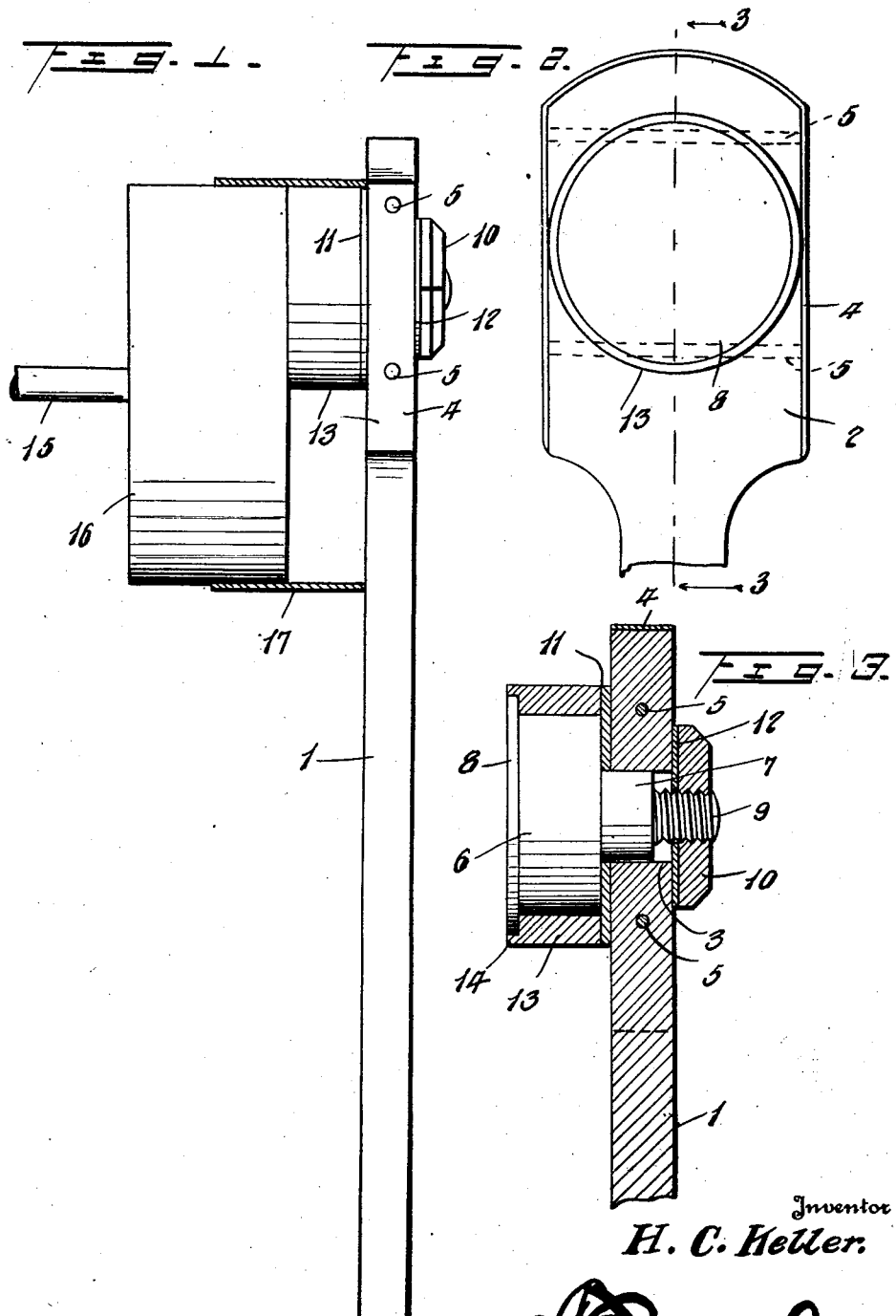
Inventor
H. C. Keller.

Patented Nov. 29, 1927.

1,651,063

UNITED STATES PATENT OFFICE.

HARRY C. KELLER, OF HUMMELSTOWN, PENNSYLVANIA.

BELT REPLACER.

Application filed June 8, 1926. Serial No. 114,493.

This invention relates to a novel device through the medium of which a belt may be easily and quickly replaced upon a revolving pulley without danger to the operator.

The invention consists of the construction, combination and arrangement of parts hereinafter fully described and claimed, and illustrated in the accompanying drawing, wherein:

Figure 1 is a view partly in elevation and partly in vertical section illustrating the manner in which the device is adapted to be used in replacing a belt on a revolving pulley, Figure 2 is a view in side elevation of the upper portion of the device, and Figure 3 is a sectional view taken on the vertical plane indicated by the line 3—3 of Figure 2.

Corresponding and like parts are referred to in the following description, and designated in the several views of the accompanying drawing, by similar reference characters.

The device comprises a handle or staff 1 which is preferably made of wood and which shall be sufficiently long to permit a belt to be replaced upon a revolving pulley from the floor. The upper end portion of the handle 1 is laterally enlarged, and such portion or head 2 is provided with an opening 3 and is reenforced by a metal strap 4. The opening 3 is located centrally between the side edges of the head 2 and at a considerable distance below the top edge of the head. The strap 4 is applied to the side and top edges of the head 2, and is secured in place by pins 5 which pass through the head 2 above and below the opening 3. An axle 6, the diametrical dimension of which is greater than its axial dimension, is fixed to the head 2, and is provided at its inner side with a boss 7 and at its outer side with a radial flange 8. The boss 7 enters the opening 3, and projecting therefrom is a threaded stud 9 upon which a retaining nut 10 is mounted. A washer 11 of greater diameter than the corresponding dimension of the flange 8, is mounted upon the boss 7 between the head 2 and axle 6, and a washer 12 is mounted upon the stud 9 between the head 2 and nut 10. A ring 13 is journaled on the axle 6 between the flange 8 and washer 11, and is provided at its outer side with an annular flange 14 which overlies the flange 8. The external diameter of the ring 13 is similar to the corresponding dimension of the washer 11, and the distance between the flange 8 and washer 11 is greater than the axial dimension of the ring so as to permit the axle 6 to be secured against casual movement on the head 2 without causing any binding action on the ring. The axle 6, washers 11 and 12, nut 10 and ring 13 are made of metal.

The device is adapted to be used to replace a belt upon a revolving pulley in the manner suggested in Figure 1, in which numeral 15 designates a shaft, 16 a pulley carried by the shaft, and 17 a belt partly applied to the pulley. To replace the belt 17 upon the pulley 16, the operator grasps the handle 1 at the desired distance from the ring 13, places the ring in contact with the lower face of the upper run of the belt at a point in close proximity to the pulley, lifts said run of the belt until it is above the pulley, and thence moves the device laterally to carry the belt onto the pulley. As the head 2 extends above and below the ring 13, there is no danger of the belt 17 slipping off of the ring, and there is no danger of carrying the ring into contact with the spokes of the pulley 16, while moving the device laterally to effect the application of the belt to the pulley.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

A belt replacer comprising a handle provided with an opening, an axle larger diametrically than axially and provided at its inner side with a boss entering the opening and a threaded stud projecting through the opening, a retaining nut mounted on the stud, a radially extending flange at the outer side of the axle, a washer positioned between the handle and axle and extending radially beyond the flange, and a ring of equal diameter with the washer mounted upon the axle between the flange and washer and provided with a flange overlying the first named flange, the axial dimension of the ring being less than the distance between the flange and washer to permit the axle to be secured to the handle without exerting any binding action on the ring.

In testimony whereof I affix my signature.

HARRY C. KELLER.